(12) United States Patent
Liao et al.

(10) Patent No.: US 9,723,309 B2
(45) Date of Patent: Aug. 1, 2017

(54) METHOD AND APPARATUS FOR DETECTING GRADUAL TRANSITION PICTURE IN VIDEO BITSTREAM

(71) Applicant: THOMSON LICENSING, Issy de Moulineaux (FR)

(72) Inventors: Ning Liao, Beijing (CN); Zhibo Chen, Beijing (CN); Kai Xie, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 190 days.

(21) Appl. No.: 14/423,325

(22) PCT Filed: Dec. 29, 2012

(86) PCT No.: PCT/CN2012/087940
§ 371 (c)(1),
(2) Date: Feb. 23, 2015

(87) PCT Pub. No.: WO2014/029188
PCT Pub. Date: Feb. 27, 2014

(65) Prior Publication Data
US 2015/0215619 A1 Jul. 30, 2015

(51) Int. Cl.
*H04N 11/02* (2006.01)
*H04N 19/109* (2014.01)
(Continued)

(52) U.S. Cl.
CPC ........... *H04N 19/109* (2014.11); *H04N 5/147* (2013.01); *H04N 17/004* (2013.01);
(Continued)

(58) Field of Classification Search
CPC .................................................... H04N 19/109
(Continued)

(56) References Cited

U.S. PATENT DOCUMENTS

| 5,642,174 A | 6/1997 | Kazui et al. |
| 6,084,641 A * | 7/2000 | Wu ........................ H04N 5/147 348/595 |

(Continued)

FOREIGN PATENT DOCUMENTS

| CN | 101543075 | 9/2009 |
| CN | 101330619 | 3/2012 |

(Continued)

OTHER PUBLICATIONS

Jörgen Gustafsson Ericsson Research et al: "Draft Recommendation P.NBAMS-LR N (for consent); TD 910 (GEN/12)";ITU-T Draft; Study Period 2009-2012;International Telecommunication Union, Geneva, Switzerland;vol. 14/16, Sep. 6, 2012, pp. 1-57;retrieved on Sep. 6, 2012.

(Continued)

*Primary Examiner* — Leron Beck
(74) *Attorney, Agent, or Firm* — Brian J. Dorini; Ronald J. Kolczynski

(57) ABSTRACT

The invention provides a method and apparatus for detecting a gradual transition picture in a bitstream. The method comprises: accessing a bitstream including encoded pictures; and determining a gradual transition picture in the bitstream using information from the bitstream without decoding the bitstream to derive pixel information.

4 Claims, 4 Drawing Sheets

(51) Int. Cl.
*H04N 5/14* (2006.01)
*H04N 17/00* (2006.01)
*H04N 19/142* (2014.01)
*H04N 19/48* (2014.01)
*H04N 19/154* (2014.01)
*H04N 19/176* (2014.01)
*H04N 19/182* (2014.01)
*H04N 19/184* (2014.01)
*H04N 19/11* (2014.01)

(52) U.S. Cl.
CPC ......... *H04N 19/142* (2014.11); *H04N 19/154* (2014.11); *H04N 19/176* (2014.11); *H04N 19/182* (2014.11); *H04N 19/184* (2014.11); *H04N 19/48* (2014.11); *H04N 19/11* (2014.11)

(58) Field of Classification Search
USPC ..................................... 375/240.12
See application file for complete search history.

(56) References Cited

U.S. PATENT DOCUMENTS

| | | | | |
|---|---|---|---|---|
| 6,307,886 | B1* | 10/2001 | Westermann | H04N 19/51 375/240.09 |
| 6,381,278 | B1* | 4/2002 | Shin | G11B 27/28 348/700 |
| 6,721,361 | B1* | 4/2004 | Covell | G11B 27/031 348/594 |
| 6,735,253 | B1 | 5/2004 | Chang et al. | |
| 7,548,565 | B2* | 6/2009 | Sull | G06F 17/30796 370/503 |
| 8,189,114 | B2* | 5/2012 | Petersohn | G06K 9/00765 348/135 |
| 2001/0021267 | A1 | 9/2001 | Jun et al. | |
| 2002/0027616 | A1 | 3/2002 | Jun et al. | |
| 2003/0185442 | A1 | 10/2003 | Yang et al. | |
| 2007/0085931 | A1* | 4/2007 | Guionnet | H04N 5/147 348/701 |
| 2007/0098074 | A1 | 5/2007 | Kubota et al. | |
| 2007/0195878 | A1 | 8/2007 | Bruls et al. | |
| 2010/0074328 | A1* | 3/2010 | Zuo | H04N 19/172 375/240.03 |
| 2010/0111180 | A1* | 5/2010 | Gao | H04N 19/159 375/240.13 |
| 2010/0157057 | A1 | 6/2010 | Lim et al. | |

FOREIGN PATENT DOCUMENTS

| | | |
|---|---|---|
| JP | 2001285712 | 10/2001 |
| JP | 2005505165 | 2/2005 |
| JP | 2007124587 | 5/2007 |
| JP | 04217011 B | 11/2008 |
| WO | WO03028236 | 4/2003 |
| WO | WO2008046748 | 4/2008 |
| WO | WO2013075335 | 5/2013 |

OTHER PUBLICATIONS

Brandt et al_Fast Frame-Based Scene Change Detection in the Compressed Domain for MPEG 4 Video—Feb. 2008, The Second International Conference on Next Generation Mobile Applications, Services and Technologies, IEEE, pp. 514-520.

Meng et al_Scene Change Detection in a MPEG Compressed Video Sequene—Sep. 2008, Digital Video Compression: Algorithms and Technologies, SPIE, vol. 2419, pp. 1-11.

Aoki et al_Cut Detection in MPEG2 Compressed Data Using Macro Block Types—Oct. 2005, Transactions of Information Processing Society of Japan, Information Processing Society of Japan, vol. 46, No. SIG15 (CVIM12), pp. 51-58.

\* cited by examiner

METHOD AND APPARATUS FOR DETECTING GRADUAL TRANSITION PICTURE IN VIDEO BITSTREAM

This application claims the benefit, under 35 U.S.C. §365 of International Application PCT/CN2012/087940, filed Dec. 29, 2012, which was published in accordance with PCT Article 21(2) on Feb. 27, 2014 in English and which claims the benefit of International patent application No. PCT/CN2012/080523, filed Aug. 23, 2012.

TECHNICAL FIELD

The present invention generally relates to video quality assessment. In particular, the present invention relates to method and apparatus for detecting a gradual transition picture in a video bitstream.

BACKGROUND

In video quality assessment, there is a need in some cases to detect whether a frame in a video bitstream is a gradual transition picture, including for example, a fade-in and fade-out picture and a cross-field picture.

Conventional solutions for detecting gradual transition pictures work in pixel domain.

However, in some application scenarios, pixel information is not available for the detection of a gradual transition picture. For example, in P.NBAMS (Non-intrusive bitstream model for the assessment of performance of video streaming) of ITU-T, the quality of a video bitstream will be assessed at a Set-Top-Box without decoding the video bitstream into pixel level. In this case, the detection of a gradual transition picture in the video bitstream has to be done at the level of compressed video bitstream.

SUMMARY

In view of the above problem in the conventional technologies, the invention proposes to detect a gradual transition picture in a video bitstream at the bitstream level without decoding the bitstream into pixels.

Inventors of the invention have found that a set of consecutive frames in a bitstream which have larger intra macro block (MB) ratio than their adjacent frames are gradual transition picture positions with higher probability. This finding help propose a solution for the detection of a gradual transition picture at the bitstream level.

According one aspect of the invention, a method for detecting a gradual transition picture in a bitstream is provided. The method comprises: accessing a bitstream including encoded pictures; and determining a gradual transition picture in the bitstream using information from the bitstream without decoding the bitstream to derive pixel information.

According one aspect of the invention, an apparatus for detecting a gradual transition picture in a bitstream is provided. The apparatus comprises: a decoder accessing a bitstream including encoded pictures; and a gradual transition picture detector for determining a gradual transition picture in the bitstream using information from the bitstream without decoding the bitstream to derive pixel information.

It is to be understood that more aspects and advantages of the invention will be found in the following detailed description of the present invention.

BRIEF DESCRIPTION OF THE DRAWINGS

The accompanying drawings are included to provide further understanding of the embodiments of the invention together with the description which serves to explain the principle of the embodiments. The invention is not limited to the embodiments.

In the drawings.

DETAILED DESCRIPTION

An embodiment of the present invention will now be described in detail in conjunction with the drawings. In the following description, some detailed descriptions of known functions and configurations may be omitted for conciseness.

Figure 1:
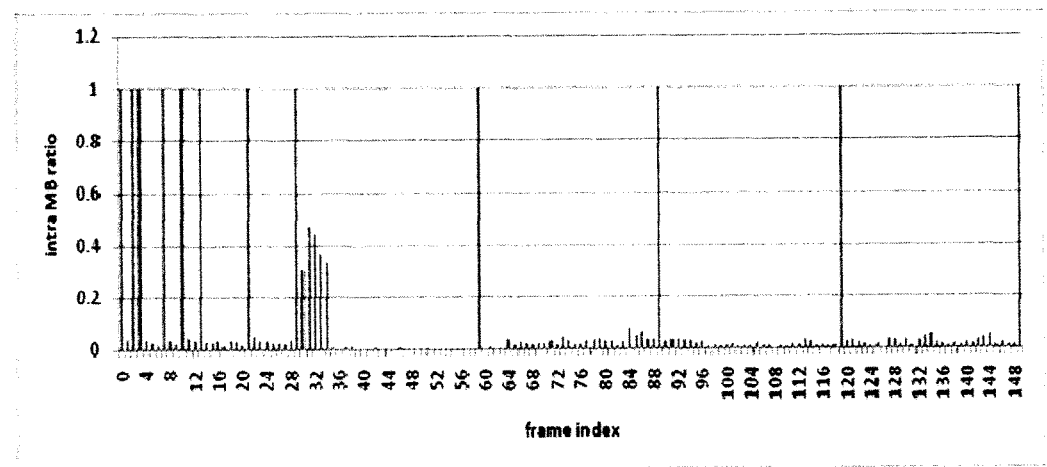
FIG. 1 is an exemplary diagram showing gradual transition pictures and their intra macro block (MB) ratios.

FIG. 1 is an exemplary diagram showing gradual transition pictures and their intra macro block (MB) ratios.

As shown in FIG. 1, the vertical axis shows an intra MB ratio of a frame. The intra MB ratio of a frame can be defined as the ratio of the number of intra-mode MBs to total number of MBs in a frame. It can also be defined as the ratio of the number of intra-mode MBs to total number of received and decoded MBs in a frame. Frames indexed by 29-33 shown in FIG. 1 are gradual transition pictures. It can be seen that the intra MB ratio of these consecutive frames are much higher than that of the surrounding frames. But it should be noted that this is the case only when there are several consecutive frames having higher intra-MB ratios. If only one frame has higher intra-MB ratio, it is actually a scene cut frame if there is a scene change. As for the above-mentioned surrounding frames, it could be understood as adjacent frames that are preceding or following a mentioned frame or consecutive frames.

Figure 2:
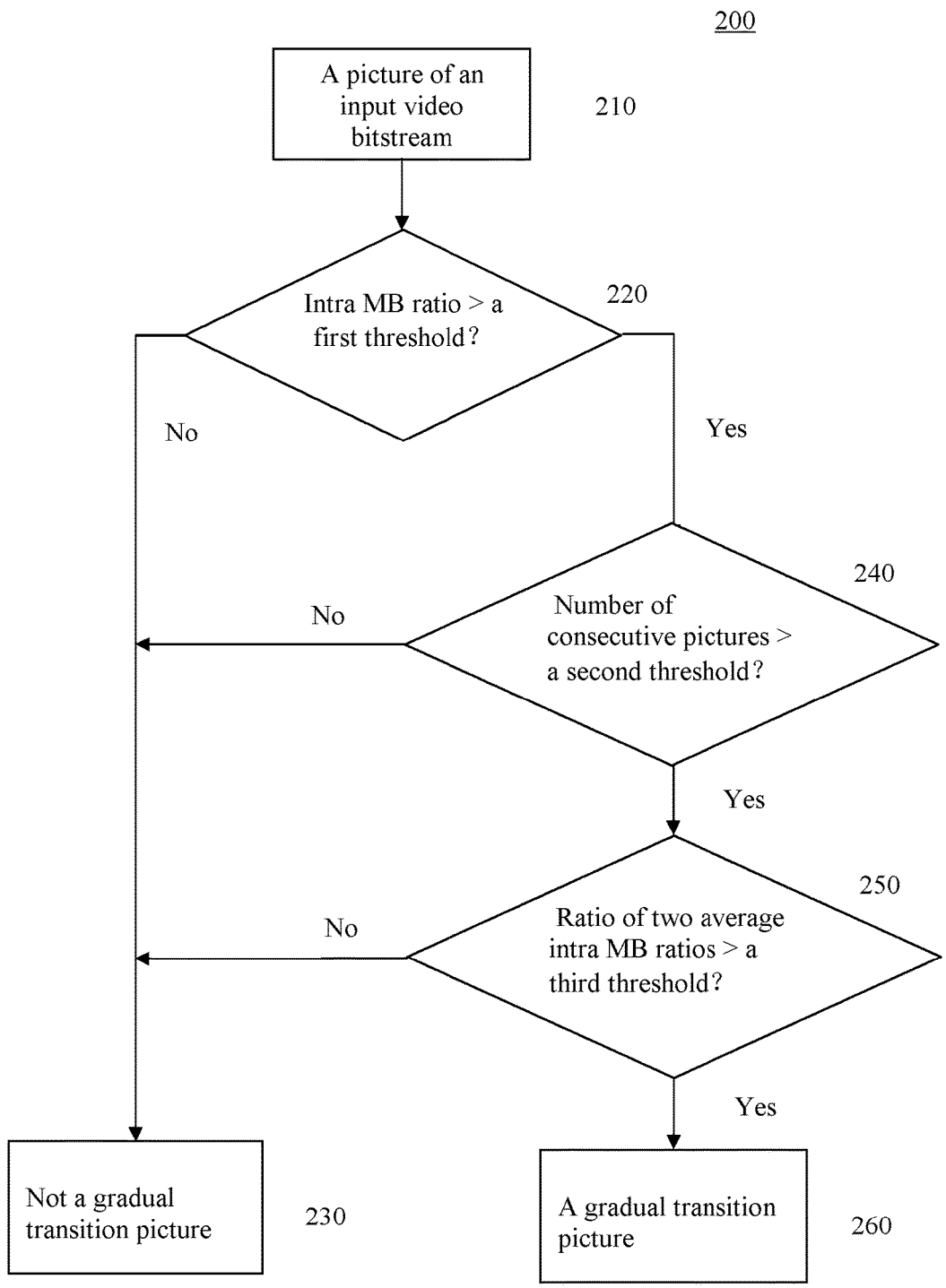
FIG. 2 is a flow chart showing a method for detecting a gradual transition picture in a bitstream according to an embodiment of the present invention.

FIG. 2 is a flow chart showing a method for detecting a gradual transition picture in a bitstream according to an embodiment of the present invention.

In method 200 shown in FIG. 2, a video bitstream is input at step 210 and a gradual transition picture in the bitstream will be detected.

At step 220, it determines whether an intra MB ratio of a picture to be detected is larger than a first predetermined threshold. If the determination result of step 220 is "No", the control is passed to step 230 wherein the picture is detected as a non-gradual transition picture.

If the determination result of step 220 is "Yes", the control is passed to step 240 wherein it determines whether the number of a set of consecutive pictures with intra-MB ratios larger than the first threshold in the surrounding pictures of the picture to be detected is larger than a second predetermined threshold. If the determination result of step 240 is "No", the control is passed to step 230 wherein the picture is detected as a non-gradual transition picture.

If the determination result of step 240 is "Yes", the control is passed to step 250 wherein it determines whether a ratio of the average intra MB ratio of the above set of consecutive pictures to the average intra MB ratio of another set of consecutive pictures in the surrounding pictures of said set of consecutive pictures is larger than a third predetermined threshold. If the determination result of step 250 is "No", the control is passed to step 230 wherein the picture is detected as a non-gradual transition picture.

If the determination result of step 250 is "Yes", at step 260, the picture is detected as a gradual transition picture.

One example of the application of the above-described method for detecting a gradual transition picture is in the context of scene cut artifacts detection. It could be appreciated that when two adjacent pictures in a video bitstream have a significant scene change therebetween and there is a packet loss occurs in the second picture, the concealed second picture will have very strong visible artifacts. These artifacts are called scene cut artifacts. Normally a detection of scene cut artifacts is necessary for video quality assessment of a bitstream. However, it was found that if a packet loss occurs in a gradual transition picture, the artifacts in the error concealed picture are less visible, which is quite contrary to scene cut artifacts. Therefore, if it can be determined in advance that a scene cut candidate picture is a gradual transition picture, there is no need to further detect the scene cut artifacts of this candidate picture.

Figure 3:
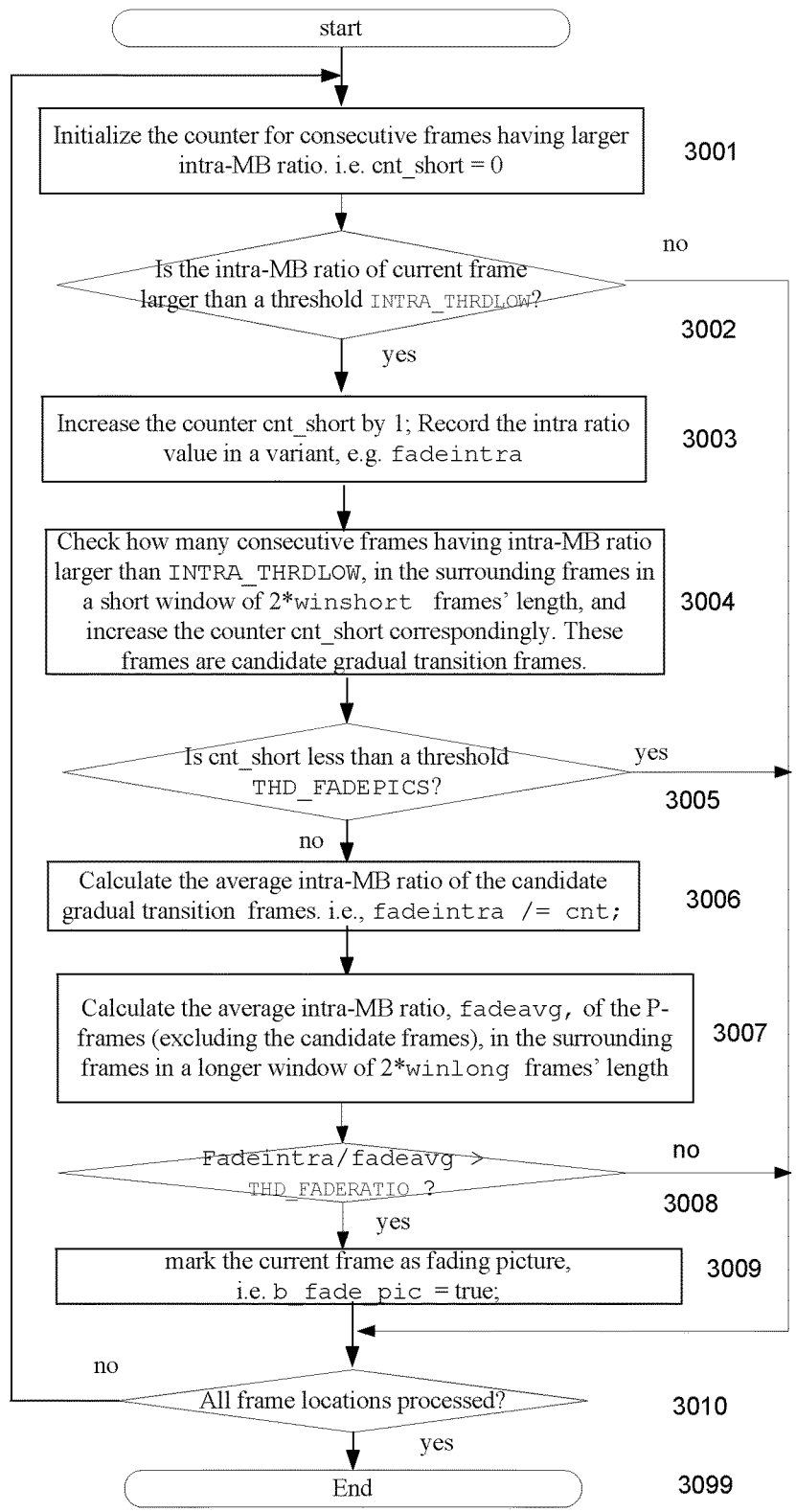
FIG. 3 is a flow chart showing an exemplary process for detecting a gradual transition picture according to an embodiment of the present invention.

FIG. 3 is a flow chart showing an exemplary process for implementing the method for detecting a gradual transition picture according to an embodiment of the present invention.

As shown in FIG. 3, a video bitstream is input and a gradual transition picture in the bitstream will be detected.

At step 3001, it initializes a counter, cnt_short, for a set of consecutive frames having larger intra MB ratios. That is, cnt_short=0.

At step 3002, it determines whether the intra MB ratio of a frame to be detected (referred to as current frame hereinafter) is larger than a first threshold INTRA_THRDLOW. For example, the first threshold INTRA_THRDLOW could be set to be 0.3 or 0.4. If the intra-MB ratio of the current frame is not larger than the first threshold INTRA_THRD-LOW, it determines that the current frame is not a gradual transition picture. The control is passed to step 3010 wherein it determines whether all frames locations of the video bitstream are processed.

If the intra-MB ratio of the current frame is larger than the first threshold INTRA_THRDLOW, the control is passed to the step 3003 wherein it increases the counter cnt_short by 1 and records the intra ratio value in a variant denoted by fadeintra.

At the next step 3004, it calculates how many consecutive frames with intra MB ratios larger than INTRA_THRD-LOW are there in the surrounding frames of the current frame in a short window of 2*win_short*frame_rate frames' length and increases the counter cnt_short correspondingly. For example, the win_short could be set to be 0.5 s. This set of consecutive frames could be selected as candidate gradual transition frames.

At step 3005, it determines whether the counter cnt_short is less than a second threshold THD_FADEPICS. The second threshold THD_FADEPICS could be set as a function of the frame rate of the bitstream, for example, frame_rate*t. For example, t=0.1 s, which corresponds to 0.1 second. It could be appreciated that the second threshold should not be less than 2. This is because that, otherwise, the frame is actually a potential scene cut frame.

If cnt_short is less than the second threshold THD_FADE-PICS, it determines that the current frame is not a gradual transition picture. This is because gradual transition content generally takes time to be viewed as gradual transition pictures. Then the control is passed to step 3010 wherein it determines whether all frame locations of the video bitstream are processed.

If cnt_short is larger than the second threshold THD_FADEPICS, the control is passed to step 3006 wherein it calculates the average intra MB ratio of the candidate gradual transition frames, i.e., fadeintra/=cnt.

At the next step 3007, it calculates the average intra MB ratio of another set of frames (excluding the candidate gradual transition frames), fadeavg, in the surrounding frames in a longer window of 2*win_long frames' length. In one example, the win_long is set to 1.5 s. Please note that since I-frames are used at the start of GOP as pre-defined, rather than encoder's choice adaptive to video features, it is preferably to calculate the average intra MB ratio of P-frames in the surrounding frames in step 3007.

At the next step 3008, it determines whether a ratio of the average intra MB ratio of the candidate gradual transition frames to the average intra MB ratio of another set of frames, fadeintra/fadeavg, is larger than a third threshold THD_FADERATIO. For example, the third threshold THD_FAD-ERATIO can be set to be 3.

If the ratio, fadeintra/fadeavg, is not larger than the third threshold THD_FADERATIO, the control is passed to step 3010 wherein it determines whether all frame locations of the video bitstream are processed.

If the above ratio, fadeintra/fadeavg, is larger than the third threshold THD_FADERATIO, then the control is passed to step 3009 wherein it determines and marks that the current frame as a gradual transition picture. As shown in FIG. 3, a gradual transition picture is marked/denoted by b_fade_pic=true.

At step 3010, it determines whether all frame locations of the video bitstream are processed. If the result is "No", the control is returned to step 3001. If the result is "Yes", the control is passed to an end step 3099.

The pseudo code of the above described process is as follows:

```
void detect_gradual transitionPicture(int frmidx)
{
  int winshort = d_avg_frame_rate * 0.5;
  int winlong = d_avg_frame_rate * 1.5;
  double INTRA_THRDLOW = 0.4;
  int THD_FADEPICS = max(2,( d_avg_frame_rate * 0.1 + 0.5));
  double THD_DIVFRMES = d_avg_frame_rate *1.0;
  double THD_FADERATIO = 3;
  float fadeavg,fadeintra;
  int cnt, pos, pos_bef, pos_aft,i;
  /* consecutive frames having larger intra ratio are potential
  fade-in and fade-out position */
  fadeintra = 0; cnt = 0;
  if (P_frame_features[frmidx]->d_IntraRatio >
  INTRA_THRDLOW)
  {
    fadeintra += P_frame features[frmidx]->d_IntraRatio); cnt ++;
  }
  else
    return;
  for (i= 1; i< winshort; i++)
  {
    pos = frmidx - i;
    if (pos <= 0 || P_frame_features[pos]->d_IntraRatio <
    INTRA_THRDLOW)
        break;
      if (P_frame_features[pos]->i_frametype == I_frame)
      {
          fadeintra += 0.6; cnt ++;
      }
      else if (P_frame_features[pos]->i_frametype == P_frame)
      {
```

```
        fadeintra += P_frame_features[pos]->d_IntraRatio; cnt ++;
        }
    }
    pos_bef = i;
        for (i= 1; i<winshort; i++)
        {
    pos = frmidx + i;
        if (pos == currfrmid ||P_frame_features[pos]->d_IntraRatio <
           INTRA_THRDLOW)
               break;
           if (lova_frames[pos]->frametype == I_frame)
    {
      fadeintra += 0.6; cnt ++;
    }
           else if (P_frame_features[pos]->i_frametype ==
              P_frame)
           {
    fadeintra += P_frame_features[pos]->d_IntraRatio; cnt ++;
    }
        }
        pos_aft = i;
        if (cnt < THD_FADEPICS)
            return;
        fadeintra /= cnt;
/*the average intra MB ratio of potential gradual transition pictures should
be much larger than the average intra MB ratio in the long window */
        fadeavg = 0; cnt = 0;
        for (int i= pos_bef; i<winlong; i++)
    {
        pos = frmidx - i;
        if (pos <= 0)
            break;
        if (P_frame_features[pos]->i_frametype == P_frame)
        {
            fadeavg += P_frame_features[pos]->d_IntraRatio; cnt ++;
        }
    }
    for (int i= pos_1; i<winlong; i++)
    {
        pos = frmidx + i;
        if (pos == i_processed_frames)
            break;
        if (P_frame_features[pos]->i_frametype == P_frame)
        {
            fadeavg += P_frame_features[pos]->d_IntraRatio; cnt ++;
        }
    }
    if (cnt > THD_DIVFRMES)
    {
      fadeavg /= cnt;
      if (fadeintra > fadeavg * THD_FADERATIO)
        P_frame_features[frmidx]->b_fade_pic = true;
    }
}
```

Figure 4:
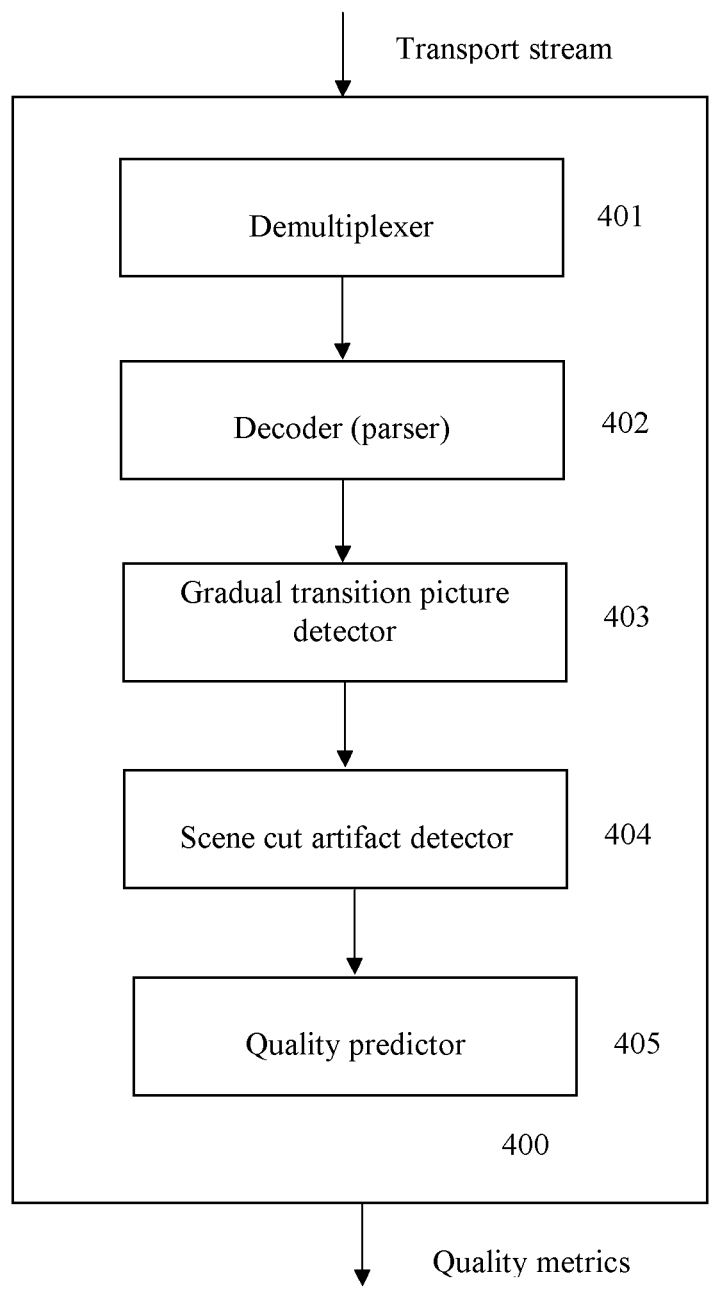
FIG. 4 is a block diagram showing an example of a video quality monitor using the method for detecting a gradual transition picture in a bitstream according to an embodiment of the present invention.

FIG. 4 is a block diagram showing an example of a video quality monitor 400 using the method for detecting a gradual transition picture in a bitstream according to an embodiment of the present invention.

The input of the video quality monitor 400 may include a transport stream that contains the bitstream. The input may be in other formats that contains the bitstream.

A demultiplexer 401 obtains packet layer information, for example, number of packets, number of bytes, frame sizes, from the bitstream.

A decoder 402 parses the input stream to obtain more information, for example, frame type, prediction residuals, and motion vectors. Decoder 402 may or may not reconstruct the pictures. In other embodiments, the decoder may perform the functions of the demultiplexer.

A gradual transition picture detector 403 detects whether a frame in the transport stream is a gradual transition picture. Method 200 described with reference to FIG. 2 and the specific process described with reference to FIG. 3 may be used by the gradual transition picture detector 403.

The detection result of the gradual transition picture detector 403 can be provided to a scene cut artifact detector 404 of the video quality monitor 400. As described above, a frame in the transport stream which is determined as a gradual transition picture will not be selected as a candidate frame for a scene cut artifact detection.

After the scene cut artifacts are detected in a macroblock level, a quality predictor 405 maps the artifacts into a quality score. The quality predictor 405 may consider other types of artifacts, and it may also consider the artifacts caused by error propagation.

The video quality monitor 400 may be used by a content creator, a content distributor or a user device. In any of the applications, quality metrics provided by the video quality monitor 400 can be used to adapt the various video parameters and error concealment techniques to improve the video quality.

It is to be understood that the present invention may be implemented in various forms of hardware, software, firmware, special purpose processors, or a combination thereof.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, comprising the steps of:
   accessing, by a video quality monitor device, a bitstream including encoded pictures to obtain a picture to be detected; and
   determining, by the video quality monitor device, that a picture is a gradual transition picture in the bitstream when an intra macro block ratio of the picture is larger than a first threshold, number of a set of consecutive pictures in the surrounding pictures of the picture is larger than a second threshold and a ratio of an average intra macro block ratio of said set of consecutive pictures to an average intra macro block ratio of another set of consecutive pictures in the surrounding pictures of said set of consecutive pictures is larger than a third threshold, wherein each of the set of consecutive pictures has a intra macro block ratio larger than the first threshold.

2. The method according to claim 1, wherein the intra macro block ratio in a frame is the ratio of the number of intra-mode macro blocks to total number of macro blocks in a frame.

3. The method according to claim 1, wherein the intra macro block ratio in a frame is the ratio the ratio of the number of intra-mode macro blocks to total number of received and decoded macro blocks in a frame.

4. The method according to claim 1, wherein the second threshold is set as a function of the frame rate of the video bitstream.

* * * * *